United States Patent
Kawano

(10) Patent No.: US 6,242,031 B1
(45) Date of Patent: Jun. 5, 2001

(54) METHOD OF PRODUCING DIETARY FIBROUS BREAD

(76) Inventor: Nobuhisa Kawano, 36-15, Takadanobaba 4-chome, Shinjuku-ku, Tokyo (JP)

( * ) Notice: Subject to any disclaimer, the term of this patent is extended or adjusted under 35 U.S.C. 154(b) by 0 days.

(21) Appl. No.: 08/957,069

(22) Filed: Oct. 24, 1997

(30) Foreign Application Priority Data

Oct. 30, 1996 (JP) .................................................. 8-323253
Aug. 4, 1997 (JP) .................................................. 9-208883

(51) Int. Cl.[7] ................................................. A21D 8/00
(52) U.S. Cl. ........................... 426/549; 426/94; 426/496; 426/551; 426/573
(58) Field of Search .............................. 426/94, 549, 551, 426/573, 578, 496, 504

(56) References Cited

U.S. PATENT DOCUMENTS

| 4,582,714 | * | 4/1986 | Ford et al. | 426/504 |
| 5,041,299 | * | 8/1991 | Nozaki et al. | 426/549 |
| 5,213,834 | * | 5/1993 | Ikeda et al. | 426/578 |
| 5,279,845 | * | 1/1994 | Nozaki et al. | 426/573 |
| 5,449,526 | | 9/1995 | Kawano . | |

FOREIGN PATENT DOCUMENTS

| 2-167032 | | 6/1990 | (JP) . |
| 1-316780 | * | 7/1991 | (JP) . |
| 3-175926 | | 7/1991 | (JP) . |
| 5-38263 | | 2/1993 | (JP) . |
| 5-316929 | | 12/1993 | (JP) . |
| 7-13087 | * | 8/1996 | (JP) . |
| 6-123816 | * | 12/1998 | (JP) . |
| WO 90/07880 | | 7/1990 | (WO) . |

OTHER PUBLICATIONS

Patent Abstract of Japan, vol. 15, No. 425, jp03175926, 1991.

* cited by examiner

*Primary Examiner*—Lien Tran
(74) *Attorney, Agent, or Firm*—Oblon, Spivak, McClelland, Maier & Neustadt, P.C.

(57) ABSTRACT

A method for producing high-quality dietary fibrous bread which has a creamy quality and keeps its elastic texture for a long period of time after baking or steaming, uses a hydrate gel of glucomannan (bound water) in place of water (free water) in preparing the dough in conventional bread production.

25 Claims, No Drawings

METHOD OF PRODUCING DIETARY FIBROUS BREAD

BACKGROUND OF THE INVENTION

1. Field of the Invention

The present invention relates to improvements in the production of bread. More particularly, it relates to an improved method of producing high-quality bread where the step of preparing dough with the use of water, which is indispensable in conventional bread production, is modified, and also to such dietary fibrous bread per se as produced according to the improved method.

2. Discussion of the Background

Bread is, in general, produced by adding yeast and salt to a main raw material (wheat flour or other cereal flour) to prepare dough. The dough is fermented, and then baked or steamed (See "New Edition of Encyclopedia of Food Industry", edited by the Food Industry Society of Japan, published by Kohrin Co., 1993).

Known methods for producing such bread include a direct kneading method, where the raw materials are all at once kneaded together, and a sponge dough method. Recently, a liquid seed method has been proposed, which includes a batch method and a continuous method. Also known are partially modified methods derived from these methods. One example of such partially modified methods is a method of using a powerful mixer or a dough improver to shorten the time for fermentation of the dough.

However, bread produced according to these known methods, comprising kneading raw materials with water to give dough, fermenting the resulting dough and then baking, is light bread from which most of the water used in preparing the dough has been lost. This light bread rapidly hardens and becomes brittle immediately after production.

In order to overcome this problem, sugar, and oils and fats, are used in the production of bread. Bread produced in this way can be creamy, but is not elastic; it becomes brittle the day after it is produced. The more it is chewed, the stickier or mucous its texture becomes. For these reasons, there is a general recognition that bread tastes good only when it is fresh, and fresh bread is usually put on the counters in bakeries even immediately after air cooling, like cookies. Even though re-heated, bread of this type is not restored to its original fresh taste, but rather becomes brittle. If heated in a microwave oven, the bread loses its original fresh taste and becomes sticky or mucous. Slices of bread are therefore toasted in a toaster, but the toasted bread becomes more brittle. Brittle, toasted-bread is generally eaten with butter or jam. Thus, conventional methods of producing bread, in which water (free water) is used in the step of preparing the dough, are still problematic in that the taste of the bread produced is unsatisfactory.

In an attempt to make good use of dietary fiber, it has been used as one of the raw materials to produce bread. However, the use of dietary fiber is problematic in that the bread loses its creaming quality during the step of baking. An attempt to mix purified konjak flour, a raw material for commercial Japanese konjak products, with wheat flour, for producing bread, has also been made. This was, however, ineffective in improving the quality of the bread. To produce commercial Japanese konjak products, konjak flour is first mixed with water and swollen (over a period of 100 minutes or longer), and then kneaded with a coagulant to give konjak paste, and the resulting paste is shaped and heated to give an irreversibly gelled konjak product, which is the form in which it is sold. In another attempt, adding konjak paste, neither shaped nor heated, to the ordinary raw materials of bread has been tried, by first adding water (free water) and mixing with the ordinary raw materials for bread and thereafter a suitable amount of konjak paste is added and kneaded to give dough. In these attempts, however, the use of konjak flour could not produce any meaningful results, and with the mismatched combination of bread and konjak the former being a Western-style food while the latter being a Japanese-style food, no approach to diversified changes in dietary habits was provided. At present, therefore, there has not been developed a good use of dietary fiber in bread.

Water is definitely needed in preparing dough for bread: water improves the expansion of dough and as is indispensable in homogenizing raw materials into dough. Fresh bread is both aromatic and tasty and does not contain any excess water. Thus, bread has served as the principal food all over the world. However, with developments in the mass production of bread, it is often served on the day following its production, and such one-day old bread often becomes hard, losing its original aroma, and the texture often becomes sticky or mucous. These problems are inevitable to bread, and have not been solved as of yet.

In order to compensate for these drawbacks, various food additives have been used in bread production. However, at present, even these additives cannot improve the technique of producing bread. For example, alum (potassium aluminum sulfate) is used in order to improve the expansion of dough and to improve the crispness of bread; while sodium metaphosphate, pyrophosphates, polyphosphates or the like are used for the purpose of controlling the viscosity of dough so that the crispness of bread is improved. In addition, anti-aging additives for bread include esters, such as glycerin fatty acid esters, propylene glycol fatty acid esters and sorbitan fatty acid esters. However, the demand for bread of various types, including loaves of bread, which do not use these additives, is increasing.

SUMMARY OF THE INVENTION

An object of the invention is a technique for producing high-quality bread without the use of any food additives, which keeps its creaming quality without being hardened and without giving any undesirable sticky or mucous texture, even after a few days storage.

The present inventor found that when water present in a hydrate gel of glucomannan (bound water) is used in place of ordinary water (free water) in the step of preparing dough in conventional bread production, high-quality bread can be produced without using any food additives.

The object of the invention is achieved with a method for producing dietary fiber bread, comprising adding to the main raw material (i.e., wheat flour or other cereal flour), yeast and salt and optionally saccharides, oils, fats, milk products and other auxiliary raw materials, a hydrate gel of glucomannan in place of free water to prepare dough, fermenting the dough, and baking or steaming the dough to produce bread. In this method, a synthetic baking powder can be used in place of yeast to omit the fermentation step. The present invention also relates to dietary fiber bread as produced according to these methods.

DETAILED DESCRIPTION OF THE INVENTION

In the method of producing dietary fiber bread of the present invention, water in a hydrate gel of glucomannan (this may be herein referred to as "bound water") is used in place of ordinary water (this may be herein referred to as "free water") in ordinary bread production, in the step of preparing dough. In other words, a hydrate gel of glucomannan as such is used in the method of the present invention. The other steps in the method of the present invention may be the same as those in ordinary bread production. Therefore, in the step of preparing dough in the method of the present invention, in which yeast and salt are added to the main raw material (e.g., wheat flour or cereal flour) and saccharides, oils, fats, milk products and other auxiliary raw (i.e., yeast food, etc.) materials are optionally added thereto to prepare dough, all these materials may be the same as those used in conventional bread production.

As is well known, an aqueous solution of glucomannan is gelled upon addition of a coagulant such as an alkali compound, e.g., $Ca(OH)_2$, to give a hydrate gel. When heated, this hydrate gel is converted into an irreversible elastic gel. This irreversible elastic gel is a konjak product which is a traditional Japanese food.

Any and every type of glucomannan can be used according to the present invention, provided that it can be coagulated to form a hydrate gel. One example is the so-called konjak-seiko (purified konjak flour) consisting essentially of glucomannan. It is desirable that glucomannan particles for use according to the present invention are fine enough to pass through a 160-mesh sieve, more preferably through a 180-mesh sieve, so that the time for swelling of the glucomannan or the like may be omitted. Glucomannan can be used in combination with polysaccharides and other side materials, such as those described in Japanese Patent Application Laid-Open No. 5-38263.

The amount of water to be added to and mixed with fine powdered glucomannan to prepare its hydrate gel can be such that the resulting hydrate gel can be easily kneaded with other materials of bread to produce an equilibrated condition and that the expansion of the dough is not hindered during fermentation. Therefore, the amount of water is preferably about 20 to about 80 parts by weight, more preferably from about 30 to about 60 parts by weight, per one part by weight of glucomannan.

Any and every coagulant generally used in producing ordinary edible konjak products may be used. If an alkali agent such as $Ca(OH)_2$ is used as the coagulant, the amount used should be suitable for coagulating glucomannan without making the resulting gel sticky or mucous and without causing it to give off an offensive odor. More specifically, the amount may be from 1 to 5%, preferably from 2 to 3%, based on the weight of the glucomannan. One or more alkali agents may be used, singly or in combination. If two or more alkali agents are used, they can be added to glucomannan all at once (as a mixture) or separately.

To produce a hydrate gel of glucomannan, fine-powdered glucomannan may be mixed and stirred with water for a few minutes, optionally along with other side materials such as polysaccharides, whereby the glucomannan is swollen and dissolved in the water, and the resulting solution may be mixed and kneaded with an aqueous solution or suspension of a coagulant having a suitable concentration. Thus, the hydrate gel of glucomannan is formed.

A hydrate gel of glucomannan may also be prepared, as shown in Example 1, by first mixing fine powdered glucomannan, along with optional side materials such as polysaccharides, and a powdered coagulant such as $Ca(OH)_2$, and then mixing and kneading the resultant powdered mixture with water for a few minutes. Alternatively, a hydrate gel of glucomannan may also be produced by mixing and stirring a powdery mixture of glucomannan, optional side materials and a coagulant, with water. The powdery mixture is changed into paste, after having been mixed, stirred and kneaded with water for several minutes. In this paste, glucomannan is not fully swollen, and about half thereof is hydrated while still in the form of particles. The glucomannan gradually swells to the completely swollen state, as shown in Example 2. If a hydrate gel of glucomannan is prepared according to this process, it is unnecessary to separately prepare a suspension of a coagulant.

A hydrate gel of glucomannan thus prepared in the manner mentioned above is directly added to and kneaded with powdered raw materials for bread, such as wheat flour and the like, in place of water (free water), in order to give dough. The amount of hydrate gel of glucomannan to be used may be from 0.4 to 1.5 parts by weight, per one part by weight of the powdered raw materials for bread, so that the gel added does not interfere with the expansion of the dough and that the bread produced may keep its elasticity and resist aging. For example, for loaves of bread, the amount of the gel added may be 0.8 parts by weight. Since free water added to the raw material prior to adding a hydrate gel of glucomannan may interfere with the final properties of the bread, an important property of the raw material for bread is that an amount of water sufficient to interfere with the improved aging properties of the final bread is not in the raw material for bread (i.e., in the flour) used in the present invention.

The dough thus prepared can be processed in any ordinary manner to obtain bread. In place of being expanded through fermentation with yeast, the dough may be expanded with a synthetic expander such as a synthetic baking powder, into foamy bread. The method according to the present invention, using a hydrate gel of glucomannan in place of free water in preparing the dough, is applicable also to the production of such foamy bread, producing good results. In principle, the skins of filled buns, such as Chinese buns, may be produced in basically the same manner as the bread mentioned above.

The calorie content of Chinese buns can be reduced by incorporating a hydrate gel of glucomannan into their filling. The Chinese buns may have a hydrate gel of glucomannan in both their skins and filling.

If the water existing in a hydrate gel of glucomannan (bound water) is used in preparing dough for bread, according to the present invention, the dietary fiber, glucomannan, is introduced into bread. Only when glucomannan is incorporated into bread in the manner according to the present invention, it is helpful in keeping and improving the quality of bread.

EXAMPLES

Having generally described this invention, a further understanding can be obtained by reference to certain specific examples which are provided herein for purposes of illustration only and are not intended to be limiting unless otherwise specified.

Example 1

Dietary Fibrous Bread 10 g of fine-powdered glucomannan having passed through a 160-mesh sieve, 5 g of dextrin and 0.25 g of $Ca(OH)_2$ weighing 15.25 g in total (raw material group A), were mixed and kneaded with 400 g of water at 20° C. for about 2 minutes to give a pasty hydrate gel. 180 g of the gel was added to and kneaded with 200 g of strong wheat flour, 3 g of dry yeast, 3 g of salt, 10 g of granular sugar and 20 g of salt-free butter, totaling 236 g (raw material group B), to prepare 416 g of dough. Next, this was divided and put into two stainless steel vats, fermented at 35° C. for 60 minutes, taken out for degassing or punching, again put into the vats, and further fermented for 40 minutes. Then the dough was shaped, coated on top with a stirred mixture of egg yolk, sugar and water, fermented again for 10 minutes, and finally baked in an oven at 150° C. for 15 minutes to prepare bread.

The inside structure of the bread thus prepared was randomly crosslinked. When torn, the bread had an interior profile not oriented in any one direction (isotropic), and the bread remained elastic. After air cooling for 60 minutes, the bread weighed 380 g. Two days after its production, the bread was still creamy and elastic. When the cut surface of the thus stored bread was pushed with a finger, it restored its original condition immediately. When eaten with neither jam nor butter, the bread was unexpectedly very delicious, and did not require toasting.

Example 2

Dietary Fiber Bread

The same components were used in the raw material group A as in Example 1, except that the fine-powdered, 160 mesh-passing glucomannan was replaced with ordinary, commercially-available konjak seiko (konjak flour). The raw material group A was mixed and kneaded with 600 g of water at 20° C. for about 30 minutes to have a viscosity where none of the glucomannan particles were in the precipitated form, and then allowed to sit for about 6 hours to prepare a pasty hydrate gel. 180 g of the gel was mixed and kneaded with 236 g of the same material group B as in Example 1, to prepare 416 g of dough, which was then processed in the same manner as in Example 1 to prepare bread.

After air cooling, the bread weighed 400 g. The process of producing the bread in Example 2 was the same as in Example 1, except that the 160 mesh-passing glucomannan in Example 1 had been replaced with ordinary konjak flour and the hydrate gel was prepared in Example 2 by swelling with a larger amount of water under static conditions. That is, the other raw materials used in Example 2 were the same as those in Example 1 except for the particle size of glucomannan and the amount of water. The bread prepared herein was good, like that prepared in Example 1.

Incidentally, with respect to bread made by using konjak seiko (konjak flour) as the glucomannan as in Example 2, the offensive odor peculiar to glucomannan sometimes remains in the bread product because the glucomannan is water-swollen into a colloidal state, and, part may not completely come into contact with $Ca(OH)_2$ or aqueous $Ca(OH)_2$ suspension as the alkali coagulant. Therefore, that part does not coagulate irreversibly, which, in turn, may cause a sticky or mucous texture or the offensive odor. To prevent this, just before the main raw material wheat flour and others (corresponding to such raw material group B as in Example 2) and a water-swollen glucomannan (corresponding to such a pasty hydrate gel prepared by allowing a mixture of konjak flour and water to sit for about 6 hours as in Example 2) are mixed and kneaded, the water swollen glucomannan must be well stirred or kneaded for about 1 to about 2 minutes in such a way so that the glucomannan comes into complete contact with the $Ca(OH)_2$, as well as it is in contact with water. Therefore, in order to prevent a sticky or mucous texture or the offensive odor where konjak flour is used as the glucomannan, an additional step as referred to above is needed when a hydrate gel of glucomannan is mixed and kneaded with the main raw material (i.e., wheat flour and others). With this added step, konjak flour can give bread as good as bread produced with a fine-powdered glucomannan passing through a 160-mesh sieve does.

Example 3

Chinese Buns with a Filing 200 g of the hydrate gel prepared in the same manner as in Example 1, was mixed and kneaded with 200 g of medium wheat flour, 2 g of dry yeast, 6 g of sugar and 2 g of salt, totaling 210 g as raw materials, to prepare 410 g of dough for the skin of buns. Separately, 150 g of commercially-available, raw bean jam, 20 g of vegetable oils and fats and 2 g of ground sesame were kneaded under heating to prepare 130 g of a bean jam paste. 20 g of this bean jam paste was covered with 40 g of the dough prepared above to prepare a ball weighing 60 g. Six balls of that type were prepared. After coating the bottoms with paraffin paper, these balls were put into a steaming basket, fermented for 60 minutes at a temperature of 35° C. and at a humidity of 75%, and then steamed in a steamer for 30 minutes. Thus six buns were prepared, each with a beam-jam filling. After air cooling, these were rapidly frozen at −20° C. After one week, the frozen Chinese buns were thawed and heated in a microwave oven for 2 minutes and eaten. The Chinese buns were well expanded, still having their good aroma, and had a good crispy texture. The taste of the re-heated buns was the same as that of fresh and just-steamed buns. In this case, it is also possible to add, as an ingredient, a hydrate gel of glucomannan to the bean-jam filling.

Also, if a filling prepared by frying minced pork, spices, boiled bamboo shoots and minced leeks with lard, followed by seasoning with soy sauce, sugar, salt, Japanese sake, MSG and others, is covered with the dough prepared above, and processed in the same manner as in the above, Chinese meat buns may be produced. For such Chinese meat buns, a hydrate gel of glucomannan may be added to the filling by kneading it with the raw materials of the filling followed by frying. These Chinese meat buns with such a filling as prepared with the use of the hydrate gel of glucomannan are preferably because they are low-calorie and healthy.

Even though no food additives (e.g., emulsifier, alum, sodium metaphosphate, ascorbic acid, and others) ordinarily used in buns in order to prevent sticky or mucous texture, to ensure expansion, to keep elasticity and to ensure crisp texture, are added to the buns of these types, the resultant buns still have good physical properties, with no defects.

Effects of the Invention:

When a hydrate gel of glucomannan (containing bound water therein) is used in preparing dough in the production of bread, according to the present invention, the bread prepared is improved in that it resists aging, it remains elastic, gives no sticky or mucous feel and it has good crispness, even though the bread requires final baking. Therefore, the method of the present invention requires no food additives (e.g., emulsifier, alum, sodium metaphosphate, sodium lactate, ascorbic acid, etc.) which have typically been required for preventing aging, for forming gas, for improving crispness and for keeping good elasticity. In addition, the quality of the bread produced according to the method of the present invention is much improved in that it keeps its elasticity and crisp texture, the crisp texture of bread being often lost when the bread is aged.

Further, the dietary fiber bread of the present invention meets the recent tendency towards healthy foods, because of its being low-calorie. Thus, the present invention has realized the provision of completely healthy bread with no food additives. Since the bread of the present invention is massive and weighty (like boiled rice), is satisfactory for anyone who desires to take low-caloric diets. The reason why the bread of the present invention is massive and weighty is because water, bound to glucomannan, while forming a clathrate with glucomannan to form its hydrate gel, is used in the step of preparing dough so that the water existing in the bread is difficult to remove.

In the past light bread with good shape has heretofore been produced, while using various food additives therefor. As opposed to this, the present invention has realized fiber bread suitable for daily diets. Heretofore, only nominal, but bad-tasting bread has been sold on the market, at the bakers' convenience. The present invention provides an approach to the removal of this bad habit.

In addition, according to the present invention, it has become possible to provide steamed bread for easy diets, including Chinese buns, on the market, and the steamed bread of the invention also has the same advantages as those of baked bread mentioned hereinabove.

Further, the dietary fibrous bread, including Chinese buns, of the present invention resists freezing remarkably, i.e., has a high resistance to (or high resistivity against) freezing. In greater detail, the bread of the present invention receives no unfavorable influences from freezing. The bread of the present invention, even when once rapidly frozen and then thawed and heated, still maintains the same excellent properties as the fresh and just-baked or just-steamed bread. Therefore, such resistivity against freezing makes it possible to put the bread of the present invention on the market in the frozen state as frozen bread, which may, in turn, reduce greatly production costs of bread.

Thus, the economical effects as produced by the present invention are extremely great.

Obviously, numerous modifications and variations of the present invention are possible in light of the above teachings. It is therefore to be understood that within the scope of the appended claims, the invention may be practiced otherwise than as specifically described herein.

The priority documents of the present invention, Japanese Patent Applications 323,253/96 and 208,883/97, filed Oct. 30, 1996, and Aug. 4, 1997, respectively, are hereby incorporated by reference.

What is claimed as new and desired to be secured by Letters Patent of the United States is:

1. A method for producing dough, comprising:
   mixing raw materials for dough and a hydrate gel of glucomannan, to form a dough; said raw materials comprising at least flour;
   wherein said hydrate gel of glucomannan is prepared from powdered glucomannan consisting essentially of glucomannan particles small enough to pass through a 160-mesh sieve;
   wherein said hydrate gel of glucomannan is prepared without heating; and
   wherein said hydrate gel of glucomannan is the only water source in said dough.

2. The method of claim 1, wherein said raw materials further comprise yeast.

3. The method of claim 1, wherein said raw materials further comprise synthetic baking powder.

4. The method of claim 1, wherein said raw materials further comprise at least one member selected from the group consisting of salt, saccharides, oils, fats, milk products and other auxiliary raw materials.

5. The method of claim 2, wherein said raw materials further comprise at least one member selected from the group consisting of salt, saccharides, oils, fats, milk products and other auxiliary raw materials.

6. The method of claim 3, wherein said raw materials further comprise at least one member selected from the group consisting of salt, saccharides, oils, fats, milk products and other auxiliary raw materials.

7. The method of claim 1, wherein no emulsifier, alum, sodium metaphosphate, pyrophosphates, polyphosphates, esters nor ascorbic acid are added.

8. The method of claim 1, wherein no additional food additives for preventing sticky or mucous texture, for ensuring expansion, to maintain elasticity or to ensure a crisp texture, of the bread, are added.

9. The method of claim 1, wherein said hydrate gel of glucomannan is prepared by gelling an aqueous solution of said glucomannan particles with an alkali compound.

10. The method of claim 1, wherein said glucomannan particles are small enough to pass through a 180-mesh sieve.

11. The method of claim 1, wherein said hydrate gel of glucomannan is prepared by mixing said powdered glucomannan with water to produce a mixture; and
    stirring or kneading the mixture.

12. The method of claim 11, wherein said water is present in said hydrate gel of glucomannan in an amount of about 20 to 80 parts by weight per one part by weight of said powdered glucomannan.

13. The method of claim 1, wherein said hydrate gel of glucomannan is present in said dough an amount of 0.4 to 1.5 parts by weight per 1 part by weight of said raw materials.

14. The method of claim 1, further comprising:
    covering a filling, prepared with a hydrate gel of glucomannan, with said dough, to produce a dough-covered filling,
    fermenting said dough-covered filling to produce a fermented dough-covered filling; and
    baking or steaming the fermented dough-covered filling, to produce a Chinese bun.

15. A method for producing bread, comprising:
    mixing raw materials for bread and a hydrate gel of glucomannan, to form a dough;
    said raw materials comprising at least flour;
    wherein said hydrate gel of glucomannan is prepared from powdered glucomannan consisting essentially of glucomannan particles small enough to pass through a 160-mesh sieve;
    wherein said hydrate gel of glucomannan is prepared without heating;
    wherein said hydrate gel of glucomannan is the only water source in said dough;
    optionally fermenting said dough; and
    baking or steaming to produce bread.

16. The method of claim 15, wherein said raw materials further comprise yeast.

17. The method of claim 15, wherein said raw materials further comprise synthetic baking powder.

18. The method of claim 15, wherein said raw materials further comprise at least one member selected from the group consisting of salt saccharides, oils, fats, milk products and other auxiliary raw materials.

19. The method of claim 15, wherein no emulsifier, alum, sodium metaphosphate, pyrophosphates, polyphosphates, esters or ascorbic acid are added.

20. The method of claim 15, wherein no additional food additives for preventing sticky or mucous texture, for ensuring expansion, to maintain elasticity or to ensure a crisp texture, of the bread, are added.

21. The method of claim 15, wherein said hydrate gel of glucomannan is prepared by gelling an aqueous solution of said glucomannan particles with an alkali compound.

22. The method of claim 15, wherein said glucomannan particles are small enough to pass through a 180-mesh sieve.

23. The method of claim 15, wherein said hydrate gel of glucomannan is prepared by mixing said powdered glucomannan with water to produce a mixture; and stirring or kneading the mixture.

24. The method of claim 23, wherein said water is present in said hydrate gel of glucomannan in an amount of about 20 to 80 parts by weight per one part by weight of said powdered glucomannan.

25. The method of claim 15, wherein said hydrate gel of glucomannan is present in said dough an amount of 0.4 to 1.5 parts by weight per 1 part by weight of said raw materials.

* * * * *